United States Patent
Takahashi

(10) Patent No.: US 9,346,186 B2
(45) Date of Patent: May 24, 2016

(54) MIXER DRUM DRIVING APPARATUS DRIVEN BY LIQUID-PRESSURE PUMP AND AUXILIARY LIQUID-PRESSURE PUMP THAT IS DRIVEN BY ELECTRIC MOTOR

(71) Applicant: KAYABA INDUSTRY CO., LTD., Minato-ku, Tokyo (JP)

(72) Inventor: Yoshimitsu Takahashi, Saitama (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/427,305

(22) PCT Filed: Sep. 11, 2013

(86) PCT No.: PCT/JP2013/074512
§ 371 (c)(1),
(2) Date: Mar. 10, 2015

(87) PCT Pub. No.: WO2014/042182
PCT Pub. Date: Mar. 20, 2014

(65) Prior Publication Data
US 2015/0217481 A1 Aug. 6, 2015

(30) Foreign Application Priority Data
Sep. 11, 2012 (JP) .................................. 2012-199329

(51) Int. Cl.
*B28C 5/42* (2006.01)
*B01F 13/00* (2006.01)
(Continued)

(52) U.S. Cl.
CPC ............ *B28C 5/4272* (2013.01); *B01F 13/0037* (2013.01); *B01F 15/00389* (2013.01);
(Continued)

(58) Field of Classification Search
CPC ........ B28C 5/42; B28C 5/4203; B28C 5/421; B28C 5/4213; B28C 5/1856; B28C 5/4217; B28C 5/422; B60P 3/16
USPC ...................................... 366/53–63, 232–233
See application file for complete search history.

(56) References Cited

U.S. PATENT DOCUMENTS 3,391,537 A * 7/1968 Smith, Jr. .............. B28C 5/4213
60/422
3,773,304 A * 11/1973 Hodgson ................. B28C 5/422
366/44

(Continued)

FOREIGN PATENT DOCUMENTS

DE 1650734 B1 * 2/1972
JP 2003-294005 A 10/2003
(Continued)

OTHER PUBLICATIONS

International Search Report and Written Opinion mailed Dec. 10, 2013, corresponding to International application No. PCT/JP2013/074512.

*Primary Examiner* — Charles Cooley
(74) *Attorney, Agent, or Firm* — Hauptman Ham, LLP

(57) ABSTRACT

A mixer drum driving apparatus includes a liquid-pressure motor that drives the mixer drum to rotate, a liquid-pressure pump that is driven by a motive force of an engine and supplies working liquid to the liquid-pressure motor, an auxiliary liquid-pressure pump that is driven by an electric motor and supplies working liquid to the liquid-pressure motor, a pressure detector that detects a liquid pressure of working liquid discharged from the auxiliary liquid-pressure pump, and a switching valve that switches whether or not working liquid from the auxiliary liquid-pressure pump is supplied to the liquid-pressure motor. In a state in which the switching valve is closed and the mixer drum is being driven to rotate by the liquid-pressure motor that is driven by the liquid-pressure pump, the controller opens the switching valve if a liquid pressure detected by the pressure detector reaches or exceeds a preset liquid pressure.

3 Claims, 5 Drawing Sheets

(51) Int. Cl.
*B01F 15/00* (2006.01)
*F16H 61/44* (2006.01)

(52) U.S. Cl.
CPC .......... *B01F15/00545* (2013.01); *B28C 5/422* (2013.01); *B28C 5/4213* (2013.01); *B01F 2215/0047* (2013.01); *F16H 61/44* (2013.01)

(56) References Cited

U.S. PATENT DOCUMENTS

| | | | | |
|---|---|---|---|---|
| 4,542,990 | A * | 9/1985 | Fouquet | B28C 5/4213 180/14.2 |
| 5,713,663 | A * | 2/1998 | Zandberg | B01F 15/00201 366/142 |
| 6,971,463 | B2 * | 12/2005 | Shore | B60K 6/12 180/165 |
| 7,467,889 | B2 * | 12/2008 | Abe | B28C 5/4213 366/61 |
| 7,866,875 | B2 * | 1/2011 | Abe | B28C 5/4213 366/61 |
| 8,104,947 | B2 * | 1/2012 | Ando | B28C 5/4213 366/54 |
| 9,217,447 | B2 * | 12/2015 | Dybing | |
| 2007/0280035 | A1 * | 12/2007 | Abe | B28C 5/4213 366/31 |
| 2008/0008025 | A1 * | 1/2008 | Abe | B28C 5/422 366/61 |
| 2013/0000293 | A1 * | 1/2013 | Dybing | F16H 61/4148 60/327 |
| 2013/0111892 | A1 * | 5/2013 | Takahashi | B28C 5/4213 60/459 |
| 2013/0276577 | A1 * | 10/2013 | Kroschel | B28C 5/4213 74/665 B |
| 2015/0306786 | A1 * | 10/2015 | Pirri | B28C 5/421 366/60 |

FOREIGN PATENT DOCUMENTS

| | | |
|---|---|---|
| JP | 2003-294008 A | 10/2003 |
| JP | 2003-301802 A | 10/2003 |
| JP | 2007-278430 A | 10/2007 |
| JP | 2009-167659 A | 7/2009 |

* cited by examiner

MIXER DRUM DRIVING APPARATUS DRIVEN BY LIQUID-PRESSURE PUMP AND AUXILIARY LIQUID-PRESSURE PUMP THAT IS DRIVEN BY ELECTRIC MOTOR

TECHNICAL FIELD

The present invention relates to a driving apparatus of a mixer drum in a mixer truck.

BACKGROUND ART

A mixer truck is a vehicle that transports mortar or ready-mixed concrete or the like (hereinafter referred to as "fresh concrete") from a fresh concrete factory to a construction site by loading it into a mixer drum that is carried on a frame such that it can freely rotate. In order to prevent the fresh concrete from decreasing in quality and hardening, the mixer truck normally rotates the mixer drum when transporting the fresh concrete. Thereby, the fresh concrete is agitated by a plurality of spiral blades disposed within the mixer drum. On the other hand, if the mixer truck rotates the mixer drum in reverse, the fresh concrete within the mixer drum is discharged. Once the mixer truck arrives at a concrete pouring site, the fresh concrete can be supplied to a pouring location by rotating the mixer drum in reverse.

In such a mixer truck, the mixer drum must be normally rotated constantly until the fresh concrete is discharged. An engine of the mixer truck is typically used as a drive source of the mixer drum. Specifically, a rotary motive force of the engine is transmitted to a hydraulic pump via a PTO (Power Take Off), and then working oil discharged from the hydraulic pump is supplied to drive a hydraulic motor. The mixer drum is then driven to rotate by the rotation of the hydraulic motor.

In such a mixer drum driving apparatus that drives the mixer drum to rotate using only the driving force from the engine, the number of rotations of the engine must be increased especially when the mixer drum is to be rotated at a high speed. When the number of rotations of the engine is increased, noise is generated and the amount of fuel consumption rises. In order to solve this problem, for example, JP2007-278430A proposes a mixer drum driving apparatus that drives a mixer drum to rotate by driving an auxiliary hydraulic pump using an electric motor instead of driving a hydraulic pump by the engine when the mixer truck is stopped.

SUMMARY OF INVENTION

However, in the mixer drum driving apparatus disclosed in JP2007-278430A, when supplying working oil from the auxiliary hydraulic pump to the hydraulic motor, if the pressure of the working oil discharged from the auxiliary hydraulic pump is not sufficiently high, the working oil between the hydraulic pump and the hydraulic motor may flow in reverse back towards the auxiliary hydraulic pump side, and this can lead to instability in the rotation of the mixer drum.

The present invention is created in consideration of the above-described problem, and an object thereof is to maintain stable rotation of a mixer drum when supplying working liquid to a liquid-pressure motor from a liquid pressure supply source that is independent from a liquid-pressure pump.

According to one aspect of the present invention, a mixer drum driving apparatus for driving a mixer drum carried on a frame of a mixer truck such that it is freely rotatable, includes a liquid-pressure motor that is configured to drive the mixer drum to rotate, a liquid-pressure pump that is driven by a motive force of an engine of the mixer truck and that is configured to supply working liquid to the liquid-pressure motor, an auxiliary liquid-pressure pump that is provided independently from the liquid-pressure pump and that is driven by an electric motor, the auxiliary liquid-pressure pump is configured to supply working liquid to the liquid-pressure motor, a pressure detector that is configured to detect a liquid pressure of working liquid discharged from the auxiliary liquid-pressure pump, a switching valve that is configured to switch whether or not working liquid discharged from the auxiliary liquid-pressure pump is supplied to the liquid-pressure motor, and a controller that is configured to control the switching valve to open/close it. When the switching valve is in a closed state and the mixer drum is in a state in which it is driven to rotate by the liquid-pressure motor driven by the liquid-pressure pump, the controller opens the switching valve if a liquid pressure detected by the pressure detector reaches or exceeds a preset liquid pressure.

DESCRIPTION OF EMBODIMENTS

An embodiment of the present invention will now be explained below with reference to the drawings.

Figure 1:
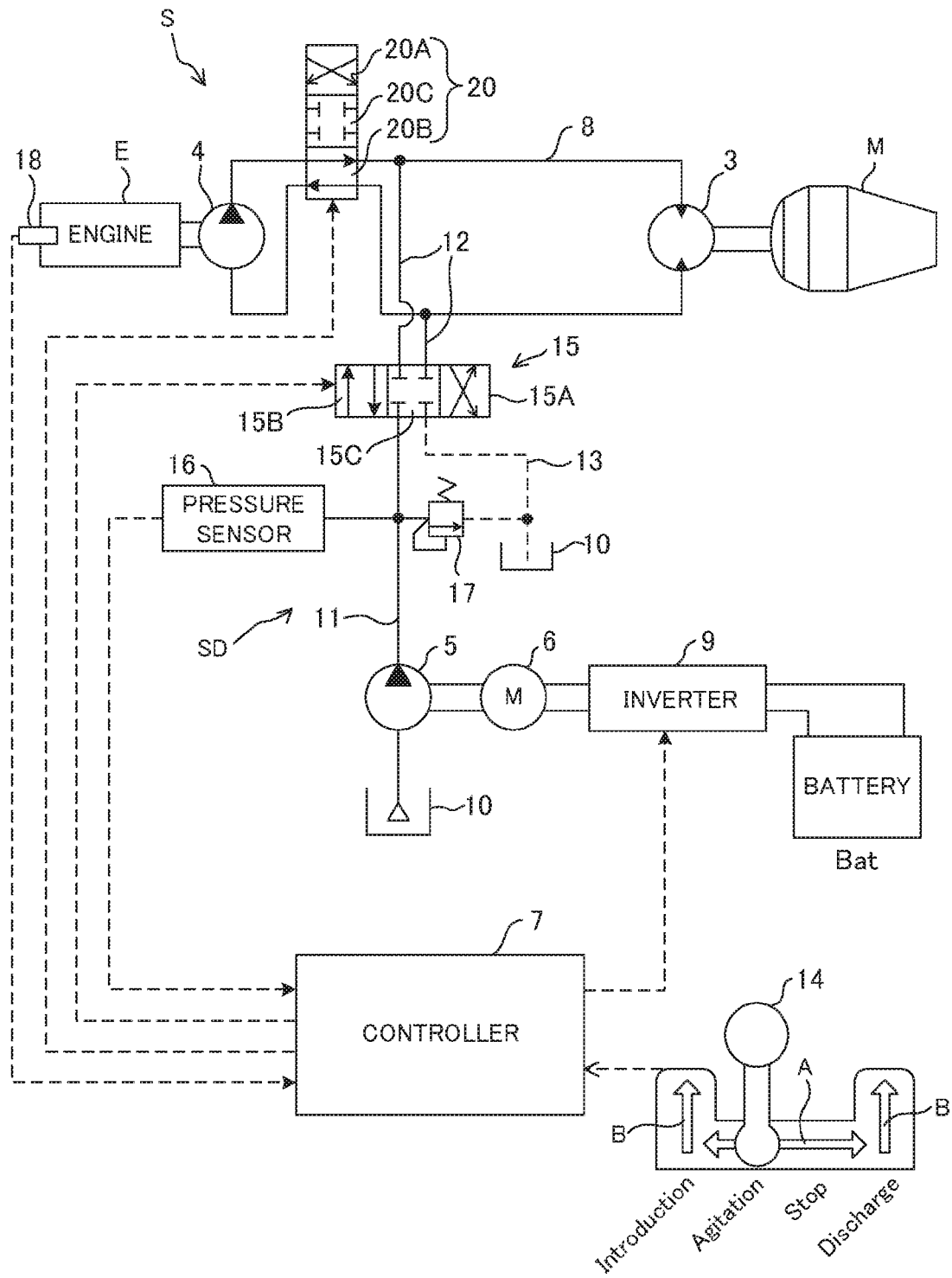
FIG. 1 is a schematic constitutional view of a mixer drum driving apparatus according to an embodiment of the present invention.
Figure 2:
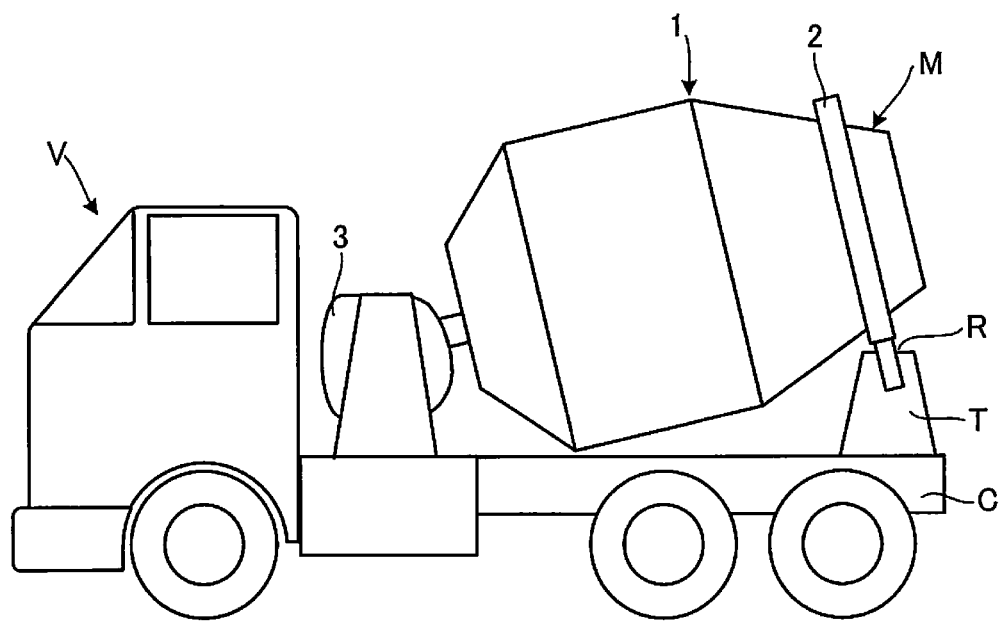
FIG. 2 is a side surface view of a mixer truck on which a mixer drum is carried in a frame.
Figure 3:
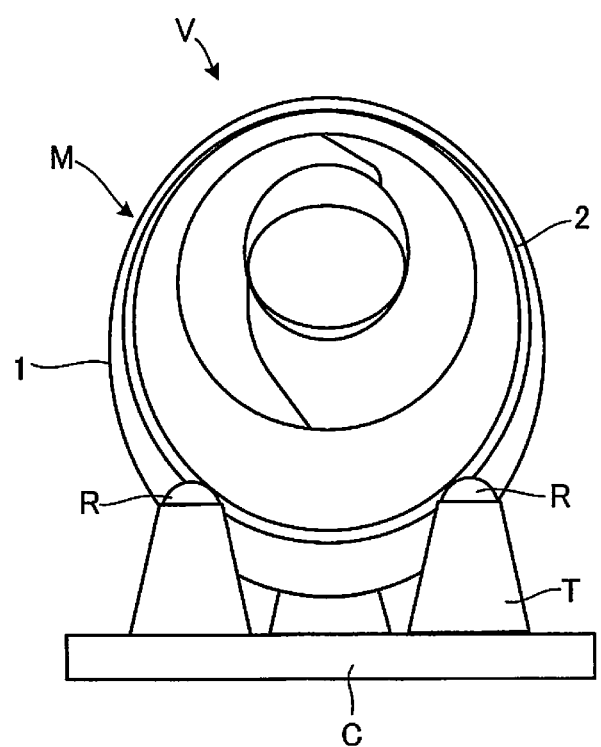
FIG. 3 is a rear surface view of a mixer truck on which a mixer drum is carried in a frame.

First, referring to FIGS. 1 to 3, the constitution of a mixer drum driving apparatus S according to an embodiment of the present invention will be explained. As shown in FIGS. 1 to 3, a mixer truck V is a vehicle that transports fresh concrete that has been loaded into a mixer drum M at a concrete plant to a pouring site. Further, after the mixer truck V discharges the fresh concrete at the pouring site, cleaning water is introduced into the mixer drum M and the mixer truck V returns to the concrete plant while cleaning the inside of the mixer drum M.

The mixer drum driving apparatus S includes the mixer drum M that is carried on a frame C of the mixer truck V such that it can freely rotate, a hydraulic motor 3 which serves as a liquid-pressure motor that drives the mixer drum M to rotate, a hydraulic pump 4 which serves as a liquid-pressure pump that is driven by a motive force of an engine E of the mixer truck V and supplies working oil to the hydraulic motor 3, and a controller 7 that controls the above components. There is also a case in which a reduction gear is interposed between the hydraulic motor 3 and the mixer drum M.

The mixer drum driving apparatus S also includes an auxiliary hydraulic device SD which serves as an auxiliary liquid-pressure device. The auxiliary hydraulic device SD includes an auxiliary hydraulic pump 5 which serves as an auxiliary liquid-pressure pump that can cooperate with the hydraulic pump 4 to supply working oil to the hydraulic motor 3 so as to rotate the mixer drum M normally or in reverse, and an electric motor 6 that drives the auxiliary hydraulic pump 5 to rotate. The hydraulic motor 3, hydraulic pump 4, auxiliary hydraulic device SD, and controller 7 which are necessary for driving the mixer drum M to rotate are mounted on the frame C.

As shown in FIGS. 2 and 3, a roller ring 2 on an outer circumference at the rear end of the mixer drum M is supported by a pair of rollers R which are provided on the end of brackets T on the frame C so that they can freely rotate. An axial core at the front end of the mixer drum M is connected to the hydraulic motor 3. Thereby, the mixer drum M is attached to the frame C such that it can freely rotate in a state in which it is tilted forward such that its rear end side is raised upwards. The mixer drum M is formed in a closed-end cylinder shape having an open rear end. The mixer drum M is formed by a drum shell 1 whose axial core is connected to the hydraulic motor 3 at a bottom part which serves as a front end.

Although not illustrated, a plurality of spiral blades are disposed on an inner circumferential side of the drum shell 1. When the mixer drum M is driven to rotate normally by the hydraulic motor 3, the blades agitate the fresh concrete loaded within the mixer drum M while moving the fresh concrete toward the front side. On the other hand, when the mixer drum M is driven to rotate in reverse by the hydraulic motor 3, the blades move the fresh concrete toward the rear end side so as to discharge it from the mixer drum M. When loading the fresh concrete into the mixer drum M, the mixer drum M is rotated normally by the hydraulic motor 3 at a higher speed than the rotation speed during agitation.

Thus, the mixer drum M rotates in the following three modes: an introduction mode used when introducing the fresh concrete, an agitation mode used when agitating the fresh concrete, and a discharge mode used when discharging the fresh concrete. In the agitation mode, it is necessary to prevent hardening of the fresh concrete and to control increases in the slump value. Therefore, the mixer drum M is rotated normally at a low speed at which hardening of the fresh concrete can be prevented. The slump value is a numerical value that indicates the fluidity of the fresh concrete, and a higher slump value indicates a higher fluidity of the fresh concrete. In other words, as the slump value increases, the fresh concrete becomes softer, and as the slump value decreases, the fresh concrete becomes harder.

As shown in FIG. 1, the hydraulic pump 4 and the hydraulic motor 3 are connected with a loop-shaped pipeline 8. The hydraulic pump 4 discharges working oil toward the hydraulic motor 3. The hydraulic pump 4 is constituted by, for example, a variable displacement piston pump. The hydraulic pump 4 is driven to rotate by a motive force of the engine E of the mixer truck V via a PTO or the like.

As shown in FIG. 1, when using the hydraulic pump 4 which discharges working oil in one direction, a direction switching valve 20 is provided in the loop-shaped pipeline 8 in order to rotate the hydraulic motor 3 in both directions. The direction switching valve 20 is a four-port three-position switching valve including the following three positions: a normal rotation position 20B in which working oil of the hydraulic pump 4 is sent toward the hydraulic motor 3 so as to normally rotate the hydraulic motor 3, a reverse rotation position 20A in which working oil of the hydraulic pump 4 is sent toward the hydraulic motor 3 so as to rotate the hydraulic motor 3 in reverse, and an intermediate position 20C in which the connection between the hydraulic motor 3 and the hydraulic pump 4 is blocked.

As the hydraulic pump 4, for example, a hydraulic pump capable of discharging in both directions so as to change the discharge direction of working oil can also be used. In this case, by connecting the hydraulic pump 4 and the hydraulic motor 3 with the loop-shaped pipeline 8 and switching the discharge direction of the hydraulic pump 4, the hydraulic motor 3 can be driven to rotate in both the normal and reverse directions. In this case, the direction switching valve 20 includes a communication position in which communication with the loop-shaped pipeline 8 is enabled and a blocking position (not illustrated).

A selection lever 14 with which an operator of the mixer truck V selects the rotation mode of the mixer drum M is provided to the mixer drum driving apparatus S. The mixer drum M rotates in the rotation mode selected by the operator via operation of the selection lever 14.

Specifically, the operator can select one of the following modes by operating the selection lever 14 in the direction of the arrow mark A in FIG. 1: the introduction mode in which the mixer drum M is rotated normally at a high speed, the agitation mode in which the mixer drum M is rotated normally at a low speed, and the discharge mode in which the mixer drum M is rotated in reverse at a high speed. As shown in FIG. 1, there is also a case in which a stop mode in which the rotation of the mixer drum M is stopped is provided between the agitation mode and the discharge mode.

In this embodiment, the selection lever 14 does not include a constitution in which it is connected to a governor (not illustrated) of the engine E via a link or the like. Therefore, even if the introduction mode or the discharge mode is selected by operation of the selection lever 14, the number of rotations of the engine E cannot be increased in order to increase the amount of discharge of working oil of the hydraulic pump 4 so as to rotate the mixer drum M at a high speed.

A signal corresponding to the rotation mode of the mixer drum M selected by operation of the selection lever 14 is input into the controller 7 from a detection switch (not illustrated). The controller 7 drives an actuator or the like that switches the direction switching valve 20 based on the signal from the detection switch. In other words, in the introduction mode and the agitation mode, the controller 7 switches the direction switching valve 20 to the normal rotation position 20B in which working oil is supplied so as to normally rotate the hydraulic motor 3. On the other hand, in the discharge mode, the controller 7 switches the direction switching valve 20 to the reverse rotation position 20A in which working oil is supplied so as to rotate the hydraulic motor 3 in reverse.

Further, if the agitation mode is selected by operation of the selection lever 14, an adjustment mechanism (not illustrated) operates to automatically adjust a tilt angle of the swash plate of the hydraulic pump 4 so that the discharge flow amount of the hydraulic pump 4 is constant regardless of the number of rotations of the engine E. Thereby, the mixer drum M rotates normally at a constant speed regardless of the number of rotations of the engine E.

In addition to the constitutions mentioned above, the mixer drum driving apparatus S also includes the auxiliary hydraulic device SD that can cooperate with the hydraulic pump 4 to supply working oil to the hydraulic motor 3 so as to rotate the mixer drum M normally or in reverse.

The auxiliary hydraulic device SD includes a hydraulic circuit consisting of an auxiliary hydraulic pump 5 that draws in working oil from a tank 10 and discharges it and a switching valve 15 that supplies working oil discharged from the auxiliary hydraulic pump 5 to one direction of the loop-shaped pipeline 8 and discharges the working oil from the other direction to return it to the tank 10. The auxiliary hydraulic device SD also includes an electric motor 6 that is constituted by a polyphase alternating current motor, an inverter 9 that adjusts polyphase alternating current electrical power supplied to the electric motor 6, and a power source Bat that supplies direct current electrical power to the inverter 9.

Figure 5:
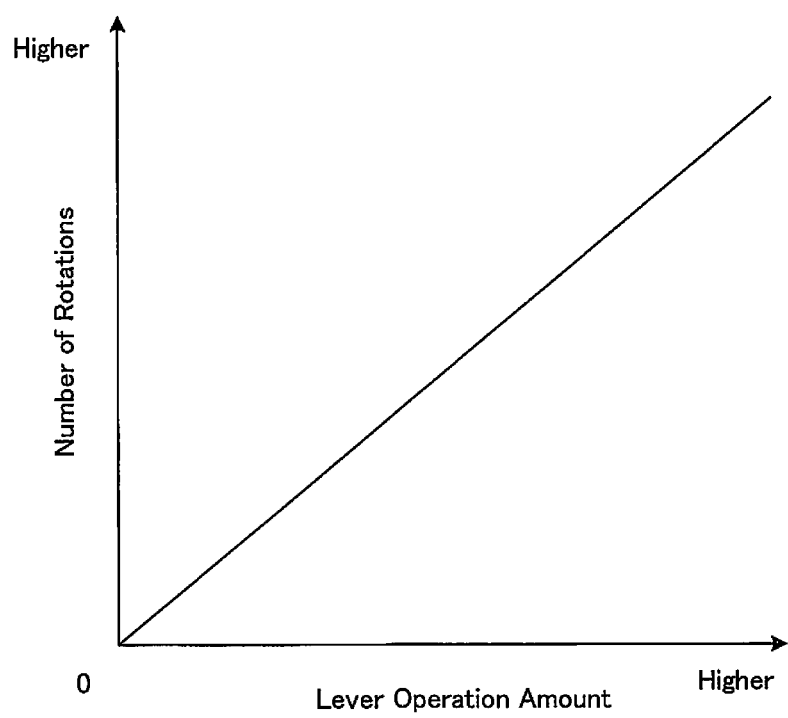
FIG. 5 is an explanatory view illustrating the characteristics of an electric motor.

The auxiliary hydraulic pump 5 is driven by the electric motor 6, the inverter 9, and the power source Bat. The inverter 9 is controlled by the controller 7. The inverter 9 increases a polyphase alternating current electrical power supplied to the electric motor 6 in accordance with an amount of operation of the selection lever 14 in the direction of the arrow mark B when the introduction mode or the discharge mode is selected by operation of the selection lever 14. Thereby, as shown in FIG. 5, the number of rotations of the electric motor 6 increases in accordance with the amount of operation of the selection lever 14 in the direction of the arrow mark B.

The switching valve 15 is connected to a pair of pipelines 12 which are each connected to the loop-shaped pipeline 8 that connects the hydraulic motor 3 and the hydraulic pump 4, a pipeline 13 that is connected to the tank 10, and a discharge pipeline 11 for the auxiliary hydraulic pump 5. The switching valve 15 includes a normal rotation position 15B in which working oil from the auxiliary hydraulic pump 5 is supplied to a high pressure side of the loop-shaped pipeline 8 and a low pressure side is connected to the tank 10 during normal rotation of the mixer drum M, a reverse rotation position 15A in which working oil from the auxiliary hydraulic pump 5 is supplied to a high pressure side of the loop-shaped pipeline 8 and a low pressure side is connected to the tank 10 during reverse rotation of the mixer drum M, and an intermediate position 15C in which all ports are blocked.

The position of the switching valve 15 is switched when an actuator (not illustrated) such as a solenoid is driven by the controller 7 based on a signal from the detection switch of the selection lever 14. In other words, in the agitation mode and the stop mode, the switching valve 15 is switched to the intermediate position 15C. In the introduction mode, the switching valve 15 is switched to the normal rotation position 15B in which working oil is supplied so as to normally rotate the hydraulic motor 3. In the discharge mode, the switching valve 15 is switched to the reverse rotation position 15A in which working oil is supplied so as to rotate the hydraulic motor 3 in reverse.

A relief valve 17 for suppressing the hydraulic pressure of the discharge pipeline 11 from rising to a set value or higher at an upstream side from the switching valve 15 is provided to the discharge pipeline 11 of the auxiliary hydraulic pump 5. A pressure sensor (pressure switch) 16 that serves as a pressure detector which detects a hydraulic pressure of working oil at an upstream side from the switching valve 15 is disposed in the discharge pipeline 11 of the auxiliary hydraulic pump 5. A detection signal that is detected by the pressure sensor 16 is input into the controller 7.

The following signals are input into the controller 7: a detection signal from a rotation number sensor 18 that detects the number of rotations of the engine, a signal of the rotation mode of the mixer drum M that is selected by operation of the selection lever 14, a signal of the amount of operation in the direction of the arrow mark B when the introduction mode or the discharge mode is selected by operation of the selection lever 14, and a hydraulic pressure signal from the pressure sensor 16 of the discharge pipeline 11.

Based on the above signals, the controller 7 determines the rotation mode of the mixer drum M and the rotation state of the engine E. In the case of the agitation mode or the introduction mode in which the mixer drum M is rotated normally, the controller 7 outputs a command to switch the direction switching valve 20 of the loop-shaped pipeline 8 to the normal rotation position 20B. In the case of the discharge mode in which the mixer drum M is rotated in reverse, the controller 7 outputs a command to switch the direction switching valve 20 of the loop-shaped pipeline 8 to the reverse rotation position 20A.

If the selection lever 14 is switched to the introduction mode or the discharge mode, the controller 7 supplies a predetermined polyphase alternating current electrical power to the electric motor 6 via the inverter 9 to rotate the electric motor 6. When the electric motor 6 rotates, it drives the auxiliary hydraulic pump 5, and when the pressure sensor 16 has determined that the hydraulic pressure of the discharge pipeline 11 has risen to a preset hydraulic pressure value, the controller 7 outputs a command to switch the switching valve 15 connected to the discharge pipeline 11 from the intermediate position 15C to the normal rotation position 15B or the reverse rotation position 15A as selected by the selection lever 14. If the selection lever 14 is operated in the direction of the arrow mark B in a state in which the introduction mode or the discharge mode has been selected, the controller 7 controls the inverter 9 according to the amount of operation of the selection lever 14 so as to increase the polyphase alternating current electrical power supplied to the electric motor 6.

Next, referring to FIG. 4, the operation of the mixer drum driving apparatus S will be explained.

Figure 4:
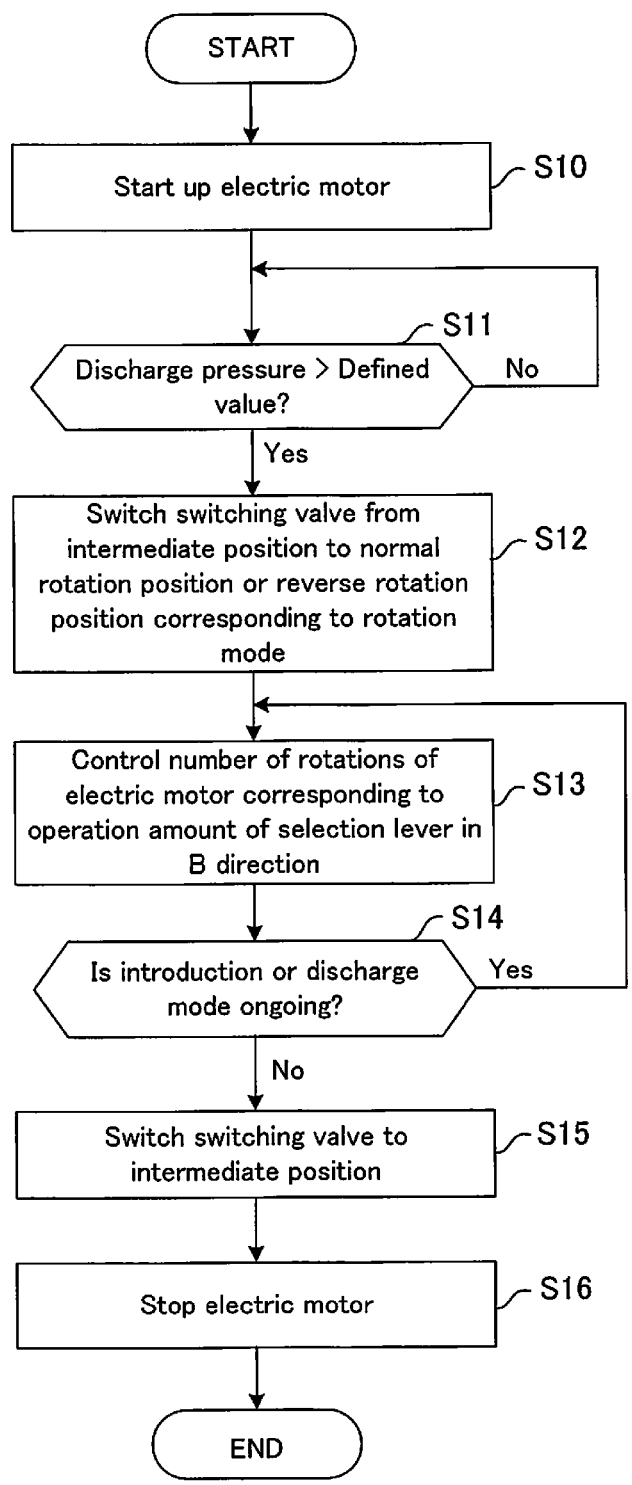
FIG. 4 is a control flow chart illustrating an operation of an auxiliary hydraulic device that is executed by a controller.

FIG. 4 is a control flowchart of the auxiliary hydraulic device SD that is activated and executed by the controller 7 when the rotation mode of the mixer drum M has been selected by operation of the selection lever 14 to the introduction mode or the discharge mode. The operation of the auxiliary hydraulic device SD will be explained below based on the flowchart shown in FIG. 4.

After being loaded with fresh concrete introduced into the mixer drum M at a concrete plant, the mixer truck V transports the fresh concrete while agitating it by rotating the mixer drum M and then stops once it reaches a pouring site. At this time, in the mixer truck V, the engine E is continuously run so as to continue agitating the fresh concrete in the mixer drum M.

In other words, working oil from the hydraulic pump 4 driven by the engine E is supplied to the hydraulic motor 3 through one side of the loop-shaped pipeline 8, and working oil that has been discharged from the hydraulic pump 3 is returned to the hydraulic pump 4 through the other side of the loop-shaped pipeline 8. In this state, the electric motor 6 and the auxiliary hydraulic pump 5 of the auxiliary hydraulic device SD are stopped, and the switching valve 15 is in the intermediate position 15C which is a blocked state. Therefore, the hydraulic motor 3 is rotated to agitate the fresh concrete by only the working oil discharged from the hydraulic pump 4 driven by the engine E.

In this state, the operator operates the selection lever 14 to select the discharge mode in order to pour the fresh concrete at the pouring site. When the discharge mode is selected, the flowchart shown in FIG. 4 is executed beginning at the point in time when the selection lever 14 is switched to the discharge mode.

Once the selection lever 14 is switched to the discharge mode, first, the direction switching valve 20 of the loop-shaped pipeline 8 is switched to the reverse rotation position 20A by the controller 7, and working oil discharged from the hydraulic pump 4 is supplied in a direction to rotate the hydraulic motor 3 in reverse. Thereby, the hydraulic motor 3 and the mixer drum M rotate in reverse at a low speed similar to that during rotation for agitation. Thus, the fresh concrete can be discharged gradually from the mixer drum M.

In step 10, the auxiliary hydraulic device SD supplies a predetermined polyphase alternating current electrical power to the electric motor 6 via the inverter 9 to rotate the electric motor 6 at a low speed. When the electric motor 6 rotates so as to drive the auxiliary hydraulic pump 5, the hydraulic pressure of the discharged working oil rises.

In step 11, it is determined whether or not the hydraulic pressure of the discharge pipeline 11 has risen to a preset hydraulic pressure value. If it is determined that the hydraulic pressure of the discharge pipeline 11 has risen to a preset hydraulic pressure value in step 11, the operation proceeds to step 12. In step 12, the switching valve 15 connected to the discharge pipeline 11 is switched from the intermediate position 15C to the reverse rotation position 15A that was selected by operation of the selection lever 14.

In other words, once the hydraulic pressure of the discharge pipeline 11 of the auxiliary hydraulic pump 5 has risen to a preset hydraulic pressure value, the controller 7 switches the switching valve 15 from the intermediate position 15C to the reverse rotation position 15A which is a supply position (or the normal rotation position 15B). Thereby, working oil that flows through the loop-shaped pipeline 8 leaks out to the auxiliary hydraulic device SD side at the instant that the switching valve 15 is switched, and thus unstable rotational fluctuation of the hydraulic motor 3 and the mixer drum M can be prevented.

By switching the switching valve 15, the working oil that is discharged from the auxiliary hydraulic pump 5 is supplied to the loop-shaped pipeline 8 through the switching valve 15. This working oil then combines with the working oil that is discharged from the hydraulic pump 4 and is supplied to the hydraulic motor 3. Thereby, the hydraulic motor 3 is rotated in reverse at a number of rotations that is increased in accordance with the increased amount of working oil that is discharged from the auxiliary hydraulic pump 5. Further, a portion of the working oil that is returned to the hydraulic pump 4 from the hydraulic motor 3 (the amount of working oil that was supplied by the auxiliary hydraulic pump 5) is diverted from the loop-shaped pipeline 8 and returned to the tank 10 through the switching valve 15.

In step 13, the controller 7 controls the polyphase alternating current electrical power that is supplied to the electric motor 6 by controlling the inverter 9 in accordance with the amount of lever operation of the selection lever 14 in the direction of the arrow mark B. In other words, in the above-described state, if the operator operates the selection lever 14 in the direction of the arrow mark B, the amount of operation thereof is input into the controller 7. The controller 7 then increases the polyphase alternating current electrical power supplied to the electric motor 6 by controlling the inverter 9 in accordance with the amount of lever operation of the selection lever 14. The number of rotations of the electric motor 6 increases according to the increase in the polyphase alternating current electrical power that is supplied. Thereby, since the auxiliary hydraulic pump 5 is driven at the increased number of rotations, the amount of working oil that discharged by the auxiliary hydraulic pump 5 increases.

This increased amount of working oil combines with the working oil that is discharged from the hydraulic pump 4 and is supplied to the hydraulic motor 3. The hydraulic motor 3 rotates in reverse at a number of rotations that is increased in accordance with the increased amount of the working oil discharged from the auxiliary hydraulic pump 5. Further, a portion of the working oil that is returned to the hydraulic pump 4 from the hydraulic motor 3 (the amount of working oil that was supplied by the auxiliary hydraulic pump 5) is diverted from the loop-shaped pipeline 8 and returned to the tank 10 through the switching valve 15. In this way, if the mixer drum M is rotated in reverse at a high speed, the fresh concrete that is loaded therein can be discharged according to the rotation speed of the mixer drum M.

In step 14, it is determined whether or not the introduction mode or the discharge mode is ongoing. If it is determined that the introduction mode or the discharge mode is ongoing in step 14, the process of step 13 is continuously executed.

In the discharge mode in which the fresh concrete is discharged, the mixer drum M is rotated in reverse at a high speed. The amount of working oil that is used in order to rotate the mixer drum M at a high speed is the working oil supplied from the auxiliary hydraulic device SD. Therefore, the engine E is maintained in a state in which it rotates at a low speed, which includes an idling state.

At this time, the noise generated by the electric motor 6 is small. Thus, compared to the discharge mode in which the hydraulic pump 4 is rotated at a high speed by the engine E so as to rotate the mixer drum M in reverse, the noise that is released to the outside of the truck can be greatly reduced. Further, since the hydraulic pump 4 is not rotated at a high speed by the engine E, the fuel consumed by the engine E can be reduced.

If the rotation mode is switched from the discharge mode to another mode (for example, the stop mode) by operation of the selection lever 14, the controller 7 determines in step 14 that the introduction mode or the discharge mode is not ongoing and thus the operation proceeds to step 15. In step 15, the controller 7 switches the switching valve 15 to the intermediate position 15C. In step 16, the controller 7 stops the electric motor 6 so as to stop the discharge mode.

On the other hand, even when introducing fresh concrete into the mixer drum M at the concrete plant, the engine E is operated in an idling state and working oil from the hydraulic pump 4 driven by the engine E is supplied to the hydraulic motor 3 through the loop-shaped pipeline 8. In this state, the electric motor 6 and the auxiliary hydraulic pump 5 of the auxiliary hydraulic device SD are stopped, and the switching valve 15 is in the intermediate position 15C which is a blocked state. Therefore, the hydraulic motor 3 is rotated by only the working oil discharged from the hydraulic pump 4 driven by the engine E.

In this state, the operator operates the selection lever 14 to select the introduction mode in order to introduce the fresh concrete into the mixer drum M. When the introduction mode is selected, the flowchart shown in FIG. 4 is executed beginning at the point in time when the selection lever 14 is switched to the introduction mode.

In step 10, the auxiliary hydraulic device SD supplies a predetermined polyphase alternating current electrical power to the electric motor 6 via the inverter 9 to rotate the electric motor 6 at a low speed. When the electric motor 6 rotates so as to drive the auxiliary hydraulic pump 5, the hydraulic pressure of the discharged working oil rises.

In step 11, it is determined whether or not the hydraulic pressure of the discharge pipeline 11 has risen to a preset hydraulic pressure value. If it is determined that the hydraulic pressure of the discharge pipeline 11 has risen to a preset hydraulic pressure value in step 11, the operation proceeds to step 12. In step 12, the switching valve 15 connected to the discharge pipeline 11 is switched from the intermediate position 15C to the normal rotation position 15B that was selected by operation of the selection lever 14.

By switching the switching valve 15, the working oil that is discharged from the auxiliary hydraulic pump 5 is supplied to the loop-shaped pipeline 8 through the switching valve 15. This working oil then combines with the working oil that is discharged from the hydraulic pump 4 and is supplied to the hydraulic motor 3. Thereby, the hydraulic motor 3 is rotated normally at a number of rotations that is increased in accordance with the increased amount of working oil that is discharged from the auxiliary hydraulic pump 5. Further, a portion of the working oil that is returned to the hydraulic pump 4 from the hydraulic motor 3 (the amount of working oil that was supplied by the auxiliary hydraulic pump 5) is diverted from the loop-shaped pipeline 8 and returned to the tank 10 through the switching valve 15.

In step 13, the controller 7 controls the polyphase alternating current electrical power that is supplied to the electric motor 6 by controlling the inverter 9 in accordance with the amount of lever operation of the selection lever 14 in the direction of the arrow mark B. In other words, in the above-described state, if the operator operates the selection lever 14 in the direction of the arrow mark B, the amount of operation thereof is input into the controller 7. The controller 7 then increases the polyphase alternating current electrical power supplied to the electric motor 6 by controlling the inverter 9 in accordance with the amount of lever operation of the selection lever 14. The number of rotations of the electric motor 6 increases according to the increase in the polyphase alternating current electrical power that is supplied. Thereby, since the auxiliary hydraulic pump 5 is driven at the increased number of rotations, the amount of working oil that discharged by the auxiliary hydraulic pump 5 increases.

This increased amount of working oil combines with the working oil that is discharged from the hydraulic pump 4 and is supplied to the hydraulic motor 3. The hydraulic motor 3 rotates normally at a number of rotations that is increased in accordance with the increased amount of the working oil discharged from the auxiliary hydraulic pump 5. Further, a portion of the working oil that is returned to the hydraulic pump 4 from the hydraulic motor 3 (the amount of working oil that was supplied by the auxiliary hydraulic pump 5) is diverted from the loop-shaped pipeline 8 and returned to the tank 10 through the switching valve 15. In this way, if the mixer drum M is rotated normally at a high speed, the fresh concrete that has been supplied can be introduced into the mixer drum M.

In step 14, it is determined whether or not the introduction mode or the discharge mode is ongoing. If it is determined that the introduction mode or the discharge mode is ongoing in step 14, the process of step 13 is continuously executed.

In the introduction mode in which the fresh concrete is introduced, the mixer drum M is rotated in normally at a high speed. The amount of working oil that is used in order to rotate the mixer drum M at a high speed is the working oil supplied from the auxiliary hydraulic device SD. Therefore, the engine E is maintained in a state in which it rotates at a low speed, which includes an idling state.

At this time, the noise generated by the electric motor 6 is small. Thus, compared to the introduction mode in which the hydraulic pump 4 is rotated at a high speed by the engine E so as to rotate the mixer drum M normally, the noise that is released to the outside of the truck can be greatly reduced. Further, since the hydraulic pump 4 is not rotated at a high speed by the engine E, the fuel consumed by the engine E can be reduced.

If the rotation mode is switched from the introduction mode to another mode (for example, the agitation mode) by operation of the selection lever 14, the processes of steps 14 to 16 are executed. Thereby, the auxiliary hydraulic device SD is stopped, and the mixer drum M rotated for agitation by only the working oil from the hydraulic pump 4 that is driven by the engine E.

In the above-described embodiment, the rotation mode of the mixer drum M is controlled by the operation position of the selection lever 14. However, instead of the selection lever 14, the control of the rotation mode of the mixer drum M can also be carried out by, for example, an operation button or a selection switch or the like.

In the above-described embodiment, the timing at which the switching valve 15 is switched from the intermediate position 15C to the normal rotation position 15B or the reverse rotation position 15A is set based on the hydraulic pressure value of the discharge pipeline 11. However, this switching timing is not limited to the hydraulic pressure value of the discharge pipeline 11, and it can also be set to, for example, a timing at which a number of rotations of the auxiliary hydraulic pump 5 or a drive current value of the electric motor 6 exceeds a predetermined value. Further, the switching timing can also be set based on a state in which the number of rotations of the mixer drum M does not increase relative to operation of the selection lever 14 in the direction of the arrow mark B.

According to the above-described embodiment, the following effects are achieved.

In the mixer drum driving apparatus S, in a state in which the switching valve 15 is closed and the mixer drum M is driven to rotate by the hydraulic motor 3 that is driven by the hydraulic pump 4, the switching valve 15 is opened if the hydraulic pressure from the auxiliary hydraulic pump 5 detected by the pressure sensor 16 reaches or exceeds a preset hydraulic pressure. Thereby, since the hydraulic pressure between the auxiliary hydraulic pump 5 and the switching valve 15 has reached or exceeded the preset hydraulic pressure, working oil from the hydraulic pump 4 and the hydraulic motor 3 can be prevented from flowing back into the auxiliary hydraulic pump 5. Therefore, the hydraulic pump 4 and the auxiliary hydraulic pump 5 can supply working oil at or above the preset hydraulic pressure to the hydraulic motor 3, and thus the mixer drum M can be driven to rotate stably.

Further, the switching valve 15 includes the intermediate position 15C at which communication between the auxiliary hydraulic pump 5 and the hydraulic motor 3 is blocked. Also, once the hydraulic pressure of the working oil that is discharged from the auxiliary hydraulic pump 5 has risen to a preset predetermined value, the switching valve 15 is switched from the intermediate position 15C to the reverse rotation position 15A which is a supply position (or the normal rotation position 15B). Thereby, backflow toward the auxiliary hydraulic pump 5 side of working oil supplied from the hydraulic pump 4 to the hydraulic motor 3 can be suppressed by switching the switching valve 15 without providing a check valve or the like for preventing backflow.

In addition, the number of rotations of the electric motor 6 that drives the auxiliary hydraulic pump 5 increases in accordance with the amount of lever operation of the selection lever 14 that selects the rotation mode of the mixer drum M. Thus, the number of rotations of the mixer drum M can be arbitrarily adjusted according to the amount of lever operation of the selection lever 14 by the operator as necessary.

Embodiments of this invention were described above, but the above embodiments are merely examples of applications of this invention, and the technical scope of this invention is not limited to the specific constitutions of the above embodiments.

For example, in the above explanations, a working oil was used as the hydraulic fluid. However, a water-soluble alternative liquid and the like can also be used instead of the working oil.

This application claims priority based on Japanese Patent Application No. 2012-199329 filed with the Japan Patent Office on Sep. 11, 2012, the entire contents of which are incorporated into this specification.

The invention claimed is:

1. A mixer drum driving apparatus for driving a mixer drum carried on a frame of a mixer truck such that the mixer drum is freely rotatable, the mixer drum driving apparatus comprising:
 a liquid-pressure motor that is configured to drive the mixer drum to rotate;
 a liquid-pressure pump that is driven by a motive force of an engine of the mixer truck and that is configured to supply working liquid to the liquid-pressure motor;
 an auxiliary liquid-pressure pump that is provided independently from the liquid-pressure pump and that is driven by an electric motor, the auxiliary liquid-pressure pump is configured to supply working liquid to the liquid-pressure motor;
 a pressure detector that is configured to detect a liquid pressure of working liquid discharged from the auxiliary liquid-pressure pump;
 a switching valve that is configured to switch whether or not working liquid discharged from the auxiliary liquid-pressure pump is supplied to the liquid-pressure motor; and
 a controller that is configured to control the switching valve to open/close the switching valve, the controller being connected to the pressure detector to receive a detection signal from the pressure detector,
 wherein when the switching valve is in a closed state and the mixer drum is in a state in which the mixer drum is driven to rotate by the liquid-pressure motor driven by the liquid-pressure pump, the controller opens the switching valve if a liquid pressure detected by the pressure detector reaches or exceeds a preset liquid pressure.

2. The mixer drum driving apparatus according to claim 1, wherein
 the switching valve includes an intermediate position at which communication between the auxiliary liquid-pressure pump and the liquid-pressure motor is blocked, and
 once a liquid pressure of working liquid that is discharged from the auxiliary liquid-pressure pump has risen to a preset predetermined value, the controller is configured to switch the switching valve from the intermediate position to a supply position at which working liquid is supplied to the liquid-pressure motor.

3. The mixer drum driving apparatus according to claim 1, further comprising a selection lever that is configured to select a rotation mode of the mixer drum, wherein
 the selection lever is connected to the controller, and
 the controller is configured to increase a number of rotations of the electric motor that drives the auxiliary liquid-pressure pump in accordance with an amount of lever operation of the selection lever.

* * * * *